US012691909B1

(12) United States Patent
Refaat

(10) Patent No.: US 12,691,909 B1
(45) Date of Patent: Jul. 28, 2026

(54) UTILIZING MULTIPLE MACHINE LEARNING MODELS WITH AUTONOMOUS VEHICLES

(71) Applicant: Waymo LLC, Mountain View, CA (US)

(72) Inventor: Khaled Refaat, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 195 days.

(21) Appl. No.: 18/498,570

(22) Filed: Oct. 31, 2023

(51) Int. Cl.
*B60W 60/00* (2020.01)
*B60W 40/04* (2006.01)
*G06V 20/58* (2022.01)

(52) U.S. Cl.
CPC ........ *B60W 60/0027* (2020.02); *B60W 40/04* (2013.01); *B60W 60/0015* (2020.02); *G06V 20/58* (2022.01); *B60W 2420/403* (2013.01); *B60W 2554/4041* (2020.02); *B60W 2554/4044* (2020.02); *B60W 2554/80* (2020.02)

(58) Field of Classification Search
CPC ............. B60W 60/0027; B60W 40/04; B60W 60/0015; B60W 2420/403; B60W 2554/4041; B60W 2554/4044; B60W 2554/80; G06V 20/58
See application file for complete search history.

(56) References Cited

U.S. PATENT DOCUMENTS

| | | | | |
|---|---|---|---|---|
| 10,467,526 | B1 * | 11/2019 | Appalaraju | .............. G06N 3/08 |
| 12,280,796 | B1 * | 4/2025 | Schleede | ............. B60W 60/001 |
| 2020/0026287 | A1 * | 1/2020 | Jiang | ......................... G06N 3/09 |
| 2020/0174481 | A1 * | 6/2020 | Van Heukelom | .... G05D 1/0214 |
| 2020/0272160 | A1 * | 8/2020 | Djuric | .................. G05D 1/0223 |
| 2021/0341927 | A1 * | 11/2021 | Refaat | .................. G05D 1/0214 |
| 2024/0211731 | A1 * | 6/2024 | Pronovost | ........... G06N 3/0455 |

* cited by examiner

*Primary Examiner* — Russell Frejd
*Assistant Examiner* — Brittany Renee Peko
(74) *Attorney, Agent, or Firm* — Lowenstein Sandler LLP

(57) ABSTRACT

The described aspects and implementations enable efficient utilization of multiple machine learning (ML) models with autonomous vehicles (AVs) to quickly and efficiently determine trajectory information of objects in a driving environment. During a time interval, a perception system of an AV generates, using a first ML model, an embedding based on data that characterizes an object's trajectory in the driving environment. At each sub-interval of multiple sub-intervals during the time interval, a second ML model uses the embedding to generate a probability distribution for the trajectory of the object, and a planning system of the AV generates an update to the AV's trajectory based on the probability distribution.

20 Claims, 10 Drawing Sheets

First Time Interval          Second Time Interval

100

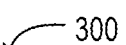

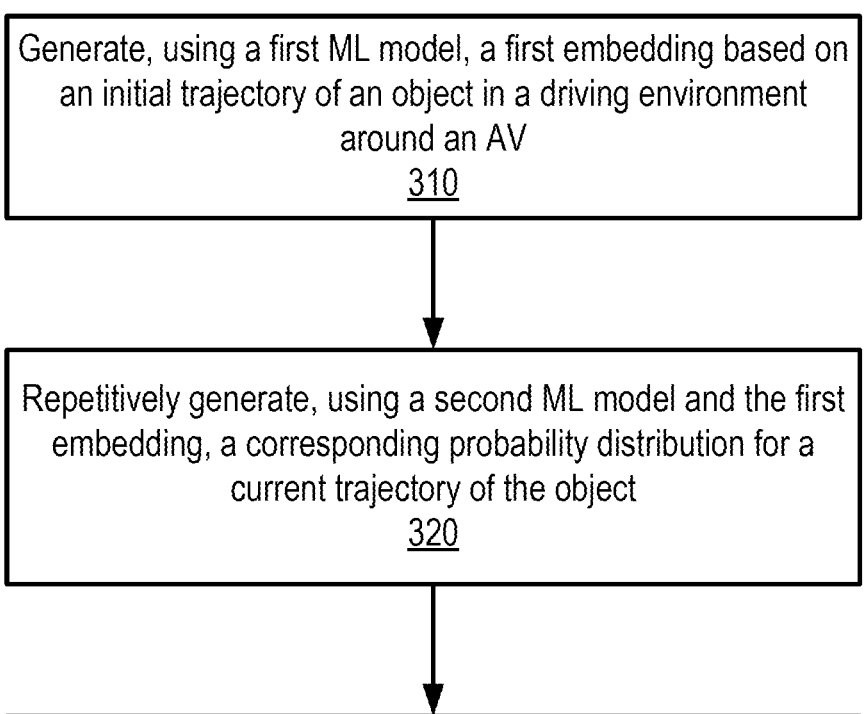

Generate, using a first ML model, a first embedding based on an initial trajectory of an object in a driving environment around an AV
310

Repetitively generate, using a second ML model and the first embedding, a corresponding probability distribution for a current trajectory of the object
320

Provide each corresponding probability distribution to a planning system of the AV to repetitively generate an update to a trajectory of the AV
330

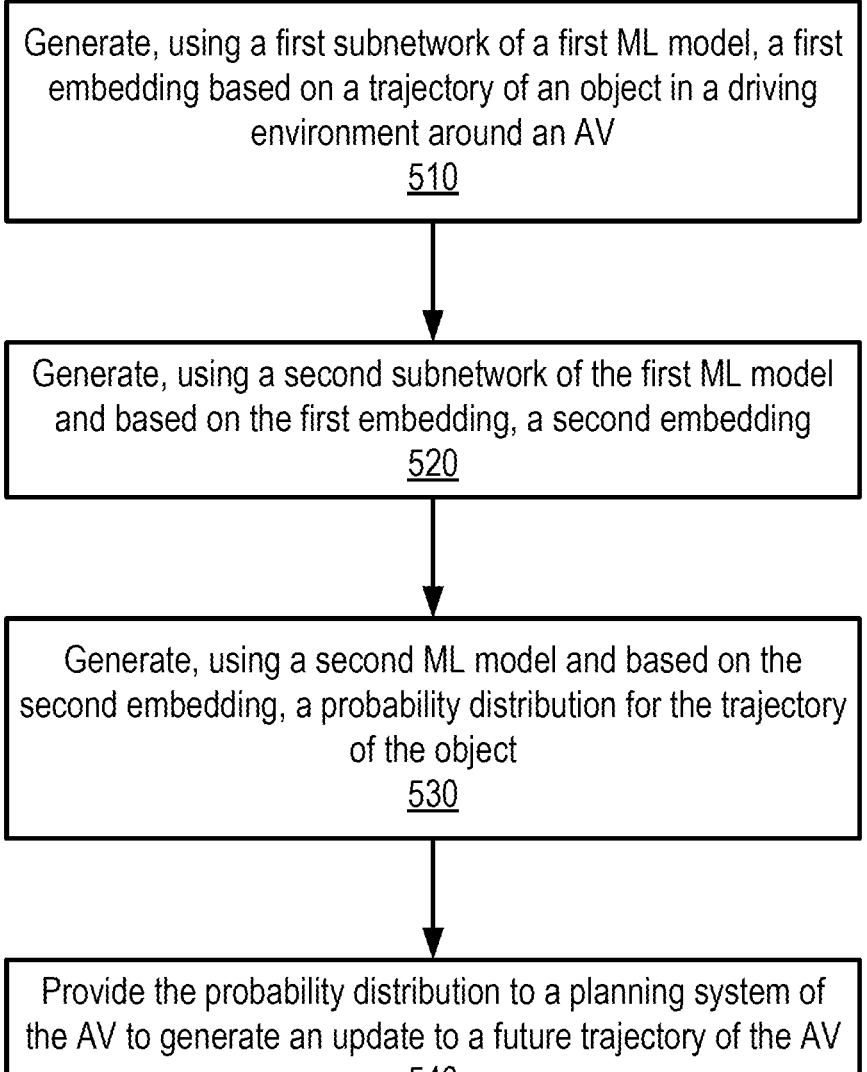

Generate, using a first subnetwork of a first ML model, a first embedding based on a trajectory of an object in a driving environment around an AV
510

Generate, using a second subnetwork of the first ML model and based on the first embedding, a second embedding
520

Generate, using a second ML model and based on the second embedding, a probability distribution for the trajectory of the object
530

Provide the probability distribution to a planning system of the AV to generate an update to a future trajectory of the AV
540

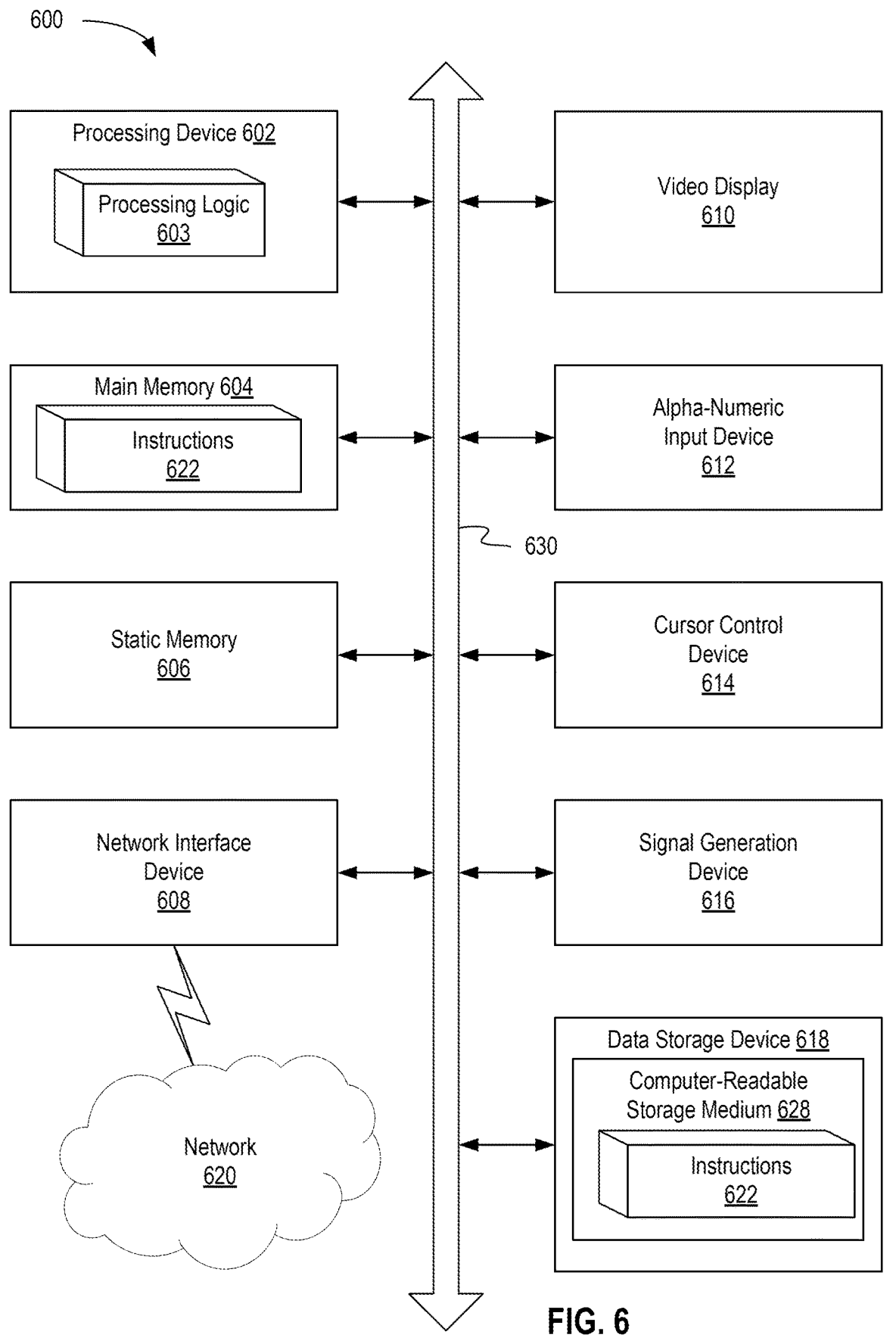

| Processing Device 602 | | Video Display 610 |
| Main Memory 604 | | Alpha-Numeric Input Device 612 |
| Static Memory 606 | | Cursor Control Device 614 |
| Network Interface Device 608 | | Signal Generation Device 616 |

Processing Logic 603

Instructions 622

630

Network 620

Data Storage Device 618

Computer-Readable Storage Medium 628

Instructions 622

FIG. 6

UTILIZING MULTIPLE MACHINE LEARNING MODELS WITH AUTONOMOUS VEHICLES

TECHNICAL FIELD

The instant specification generally relates to autonomous vehicles. More specifically, the instant specification relates to efficient utilization of multiple machine learning models with autonomous vehicles.

BACKGROUND

An autonomous (fully and partially self-driving) vehicle (AV) operates by sensing an outside environment with various sensors (e.g., radar, optical, audio, humidity, etc.). Some AVs chart a driving path through, or adjust the AV's trajectory in, the environment based on sensed data from the sensors. The sensed data includes information about other mobile objects in the environment. These mobile objects can include other vehicles, cyclists, pedestrians, animals, etc. These objects have their own trajectories that affect the driving path, the trajectory adjustment, and a speed regime selected by the AV. Selecting a safe and efficient driving path and trajectory for the AV depends on timely and accurately predicting trajectory information regarding the mobile objects.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 3 depicts a flowchart of an example method for utilizing multiple machine learning models with an AV, in accordance with some implementations of the present disclosure.

FIG. 5B depicts a flowchart of an example method for utilizing multiple machine learning models with an AV, in accordance with some implementations of the present disclosure.

FIG. 6 depicts a block diagram of an example computer device capable of utilizing multiple machine learning models with an AV, in accordance with some implementations of the present disclosure.

SUMMARY

Figure 1:
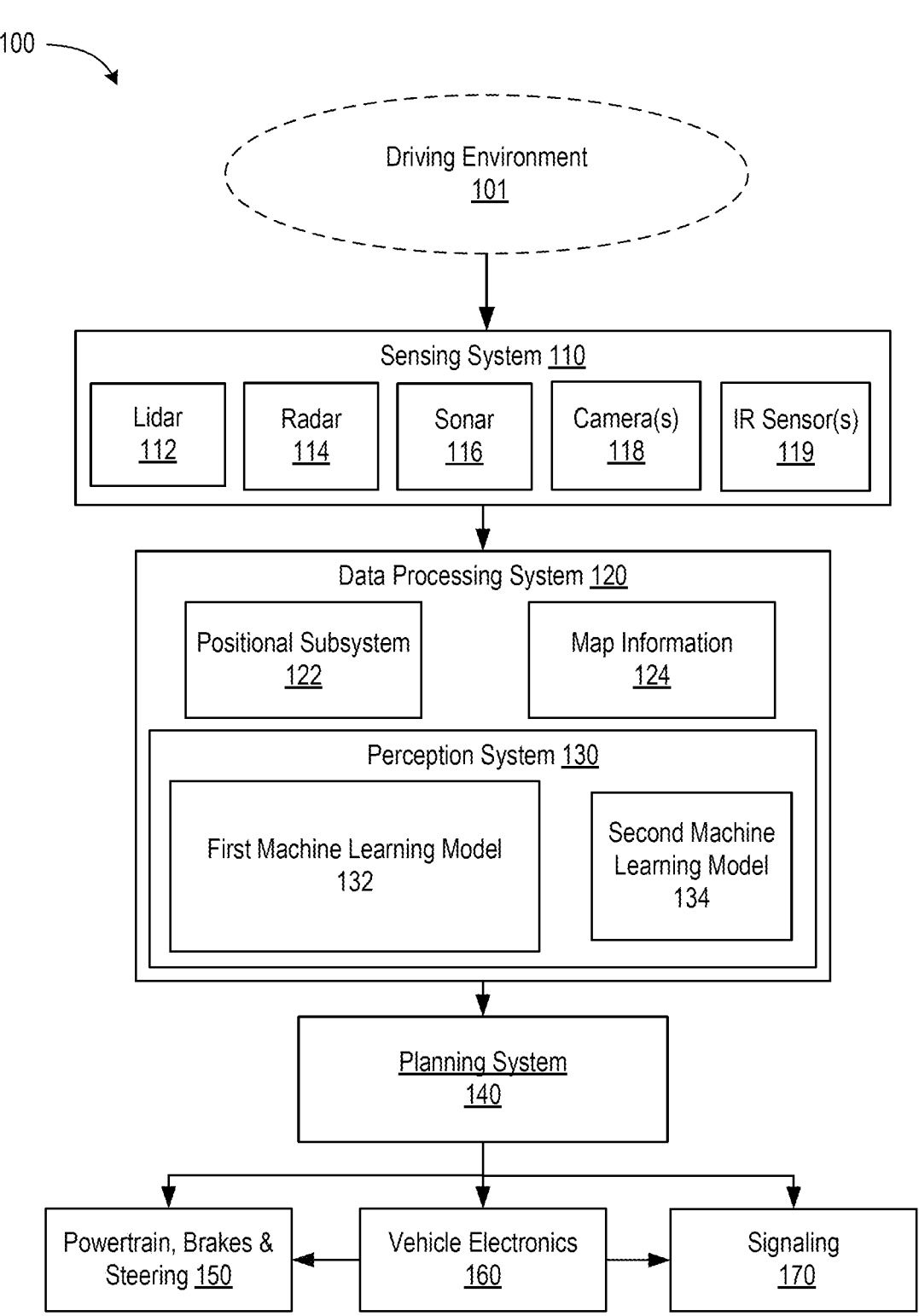
FIG. 1 depicts a block diagram of an example autonomous vehicle (AV) capable of utilizing multiple machine learning models with the AV, in accordance with some implementations of the present disclosure.

In one implementation, disclosed is a method that includes, generating, using a first machine learning (ML) model, a first embedding. Generating the first embedding may be based on an initial trajectory of an object in a driving environment around an autonomous vehicle (AV). The method further includes repetitively generating, using a second ML model and the first embedding, a corresponding probability distribution for a current trajectory of the object. The current trajectory of the object may vary for each repeated generation of the corresponding probability distribution. The method further includes providing each corresponding probability distribution to a planning system of the AV to repetitively generate an update to a trajectory of the AV.

In another implementation, disclosed is a system that includes one or more computers and one or more storage devices communicatively coupled to the one or more computers. The one or more storage devices store instructions that, when executed by the one or more computers, cause the one or more computers to perform operations. The operations include, generating, using a first ML model, a first embedding. Generating the first embedding may be based on an initial trajectory of an object in a driving environment around an AV. The operations further include repetitively generating, using a second ML model and the first embedding, a corresponding probability distribution for a current trajectory of the object. The current trajectory of the object may vary for each repeated generation of the corresponding probability distribution. The operations further include providing each corresponding probability distribution to a planning system of the AV to repetitively generate an update to a trajectory of the AV.

In another implementation, disclosed is a non-transitory computer storage media storing instructions that when executed by one or more computers cause the one or more computers to perform operations. The operations include generating, using a first subnetwork of a first ML model, a first embedding. Generating the first embedding may be based on a trajectory of an object in a driving environment around an AV. The operations further include generating, using a second subnetwork of the first ML model and based on the first embedding, a second embedding. The operations further include generating, using a second ML model and based on the second embedding, a probability distribution for the trajectory of the object. The operations further include providing the probability distribution to a planning system of the AV to generate an update to a trajectory of the AV.

DETAILED DESCRIPTION

An autonomous vehicle or a vehicle deploying various driving assistance features (AV) should safely and efficiently navigate in an environment around the AV. The environment can include mobile objects. Such objects may include other vehicles, cyclists, pedestrians, animals, or other mobile objects that may be in the environment. A mobile object may have its own trajectory of motion, and timely and accurately determining a current trajectory of the object, or predicting a future trajectory of the object, assists the AV in navigating in the environment. This may include the AV generating a probability distribution of the trajectory of the object, where the probability distribution may include one or more possible trajectories for the object, and for each trajectory, the probability that the object will follow that trajectory. The AV may sample the environment periodically (e.g., every 100 to 300 milliseconds) in order to quickly respond to a change in the environment.

The AV can use machine learning (ML) models to predict a trajectory of an object. For example, an artificial neural network (ANN) can include multiple nodes ("neurons") arranged in one or more layers, and a neuron may be connected to one or more neurons via one or more edges ("synapses"). The synapses may perpetuate a signal from one neuron to another, and a weight of a node or synapse may adjust a value of the signal. The ANN can undergo training to adjust the weights or adjust other features of the ANN. Such training may include inputting trajectory information of one or more objects, and other information, into the ANN and adjusting the ANN's features in response to an output of the ANN. An ANN may include a deep learning ANN, which may include an ANN with a large number of neurons, synapses, or layers. The large number of neurons, synapses, or layers may increase the accuracy of the ANN.

Unfortunately, repeatedly executing a large ANN onboard the AV at short time intervals may not be feasible because the inference time (e.g., prediction time) of the ANN may be too long. Increasing the computing resources of the AV's onboard computing equipment may also not be feasible due to limited space on the AV or economic concerns. Executing the ANN on a remote computing device with more computing resources and then transmitting the output to the AV for the onboard computing equipment may not be feasible because the latency between the remote computing device and the AV may not allow the AV to react quickly enough to an object, which would reduce the safety of the AV. Lastly, distillation, or the transfer of information from the large ANN to a smaller ML model may result in deteriorating quality, which may also result in decreased safety and efficiency.

Aspects and implementations of the present disclosure address these and other challenges of existing object interaction technologies by executing a large ML model while it generates an output, iteratively executing a small ML model whose outputs can be fed into a planning system of the AV at each iteration to quickly and efficiently update the trajectory of the AV. In some implementations, the AV may include a first ML model that can perform high-level reasoning and make high-level determinations (e.g., determining a roadgraph rather than predicting a certain motion information) and a second ML model that can perform calculations related to abrupt motion changes by objects in the environment. The first ML model may be larger than the second ML model, in some cases, ten times larger or more. The first ML model may execute during a certain time interval and provide its output to the second ML model, which may execute multiple times during that same time interval. The second ML model may use the output of the first ML model (and other information) to determine a trajectory for an object and provide that determination to a planning system of the AV to plan a trajectory of the AV. In some implementations, the first ML model and the second ML model can be trained together so that the first ML model is tuned to provide useful outputs for the second ML model. In some implementations, a dedicated graphics processing unit (GPU) can be used for the first ML model to avoid competition with other ML models hosted by the AV.

The advantages of the disclosed techniques and systems include, but are not limited to, consistent and fast determination of objects' trajectory information using smaller ML models, thus, resulting in usage of fewer computing resources of the AV's onboard computing devices, including memory consumption and processing device usage. Further, by splitting tasks between the two ML models, the architecture of the smaller ML model can be simplified, making its iterations more efficient, and allowing the larger ML model to be divided into sub-networks that can be run sequentially, further reducing usage of the AV's computing resources. Overall, accurate determination of objects' trajectory information can be achieved with smaller ML models where larger and more computationally intensive models have been typically used.

In those instances where the description of implementations refers to AVs, it should be understood that similar techniques can be used in various driver assistance systems that do not rise to the level of fully autonomous driving systems. More specifically, disclosed techniques can be used in Society of Automotive Engineers (SAE) Level 2 driver assistance systems that implement steering, braking, acceleration, lane centering, adaptive cruise control, etc., as well as other driver support. Likewise, the disclosed techniques can be used in SAE Level 3 driving assistance systems capable of autonomous driving under limited (e.g., highway) conditions. In such systems, fast and accurate detection and tracking of mobile objects can be used to inform the driver of the approaching objects, with the driver making the ultimate driving decisions (e.g., in SAE Level 2 systems), or to make certain driving decisions (e.g., in SAE Level 3 systems), such as reducing speed, changing lanes, etc., without requesting driver's feedback.

FIG. 1 is a diagram illustrating components of an example AV 100 capable of utilizing multiple machine learning models with the AV 100, in accordance with some implementations of the present disclosure. AVs 100 can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

An environment 101 around the AV 100 (sometimes referred to as the "driving environment") can include any objects (animated or non-animated) located outside the AV 100, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment 101 can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV 100, from close distances of several feet (or less) to several miles (or more).

As described herein, in a semi-autonomous or partially autonomous driving mode, even though the AV 100 assists with one or more driving operations (e.g., steering, braking and/or accelerating to perform lane centering, adaptive cruise control, advanced driver assistance systems (ADAS), or emergency braking), the human driver is expected to be situationally aware of the AV's 100 surroundings and supervise the assisted driving operations. Here, even though the AV 100 may perform all driving tasks in certain situations, the human driver is expected to be responsible for taking control as needed.

Although, for brevity and conciseness, various systems and methods may be described below in conjunction with AVs, similar techniques can be used in various driver assistance systems that do not rise to the level of fully autonomous driving systems. In the United States, the SAE has defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more infrared (IR) sensors 119. The sensing system 110 can further include one or more sonars 116, which can be ultrasonic sonars, in some implementations.

The AV 100 can further include a data processing system 120. The data processing system 120 may include one or more computers or computing devices. The data processing system 120 may include hardware or software that receives data from the sensing system 110, processes the received data, and determines how the AV 100 should operate in the driving environment 101.

The data processing system 120 can include a positional subsystem 122. The positional subsystem 122 uses positioning data, (e.g., global positioning system (GPS) and inertial measurement unit (IMU) data in conjunction with the data from the sensing system 110 to help accurately determine the location of the AV 100 with respect to fixed objects of the driving environment 101 (e.g., roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can include a perception system 130. The perception system 130 can be configured to detect objects in the driving environment 101, track one or more of the objects, and determine trajectory information of objects in the driving environment 101. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse) of certain objects. In some implementations, the perception system 130 can use radar data in combination with the data captured by the camera(s) 118.

The perception system 130 can include a first ML model 132 trained to perform high-level reasoning and make high-level determinations. The perception system 130 may also include a second ML model 134 trained to perform calculations related to abrupt motion changes by objects in the driving environment 101, as described in more detail below. In some embodiments, the first ML model 132 may include a first number of artificial neurons, and the second ML model 134 may include a second number of artificial neurons. The first number may be larger than the second number. For example, the first number may be at least ten times larger than the second number. Similarly, the first ML model 132 may have more synapses than the second ML model, in some cases, at least ten times more. The first ML model 132 may include more layers than the second ML model 134. The first ML model 132 may be larger than the second ML model 134 in other ways.

The data generated by the perception system 130, the positional subsystem 122, and the map information 124 can be used by a planning system 140 of the AV 100. The planning system 140 can include one or more algorithms that plan how the AV 100 is to behave in various driving situations and environments. For example, the planning system 140 can include a navigation system for determining a global driving route to a destination point. The planning system 140 can also include a driving path selection system for selecting a particular path through the immediate driving environment 101, which can include selecting a traffic lane, negotiating traffic congestion, choosing a place to make a U-turn, selecting a trajectory for a parking maneuver, and so on. The planning system 140 can also include an obstacle avoidance system for safe avoidance of various objects or other obstructions (rocks, stalled vehicles, a jaywalking pedestrian, and so on) within the driving environment 101 of the AV 100. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of the planning system 140 can generate control outputs for use by various systems and components of the AV 100, such as the powertrain, brakes, and steering 150, vehicle electronics 160, signaling 170, and other systems and components not explicitly shown in FIG. 1. These systems and components may modify the operations of the AV 100 based on the control output. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the planning system 140 can be delivered directly to the powertrain, brakes, and steering 150 (or signaling 170) whereas other instructions output by the planning system 140 are first delivered to the vehicle electronics 160, which generates commands to the powertrain, brakes, and steering 150 and/or signaling 170.

In one example, the planning system 140 can determine that an obstacle identified by the data processing system 120 is to be avoided by decelerating the vehicle until a safe speed is reached, followed by steering the vehicle around the obstacle. The planning system 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the planning system 140 can output instructions to the powertrain, brakes, and steering 150 to resume the previous speed settings of the vehicle.

The AV 100 can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots, etc.) or any other self-propelled vehicles capable of being operated in a self-driving mode (without a human input or with a reduced human input). "Objects" can include any entity, item, device, body, or article (animate or inanimate) located outside the AV 100, such as other vehicles, cyclists, pedestrians, animals, roadways, buildings, trees, bushes, sidewalks, bridges, mountains, piers, banks, landing strips, or other things.

Figure 2:
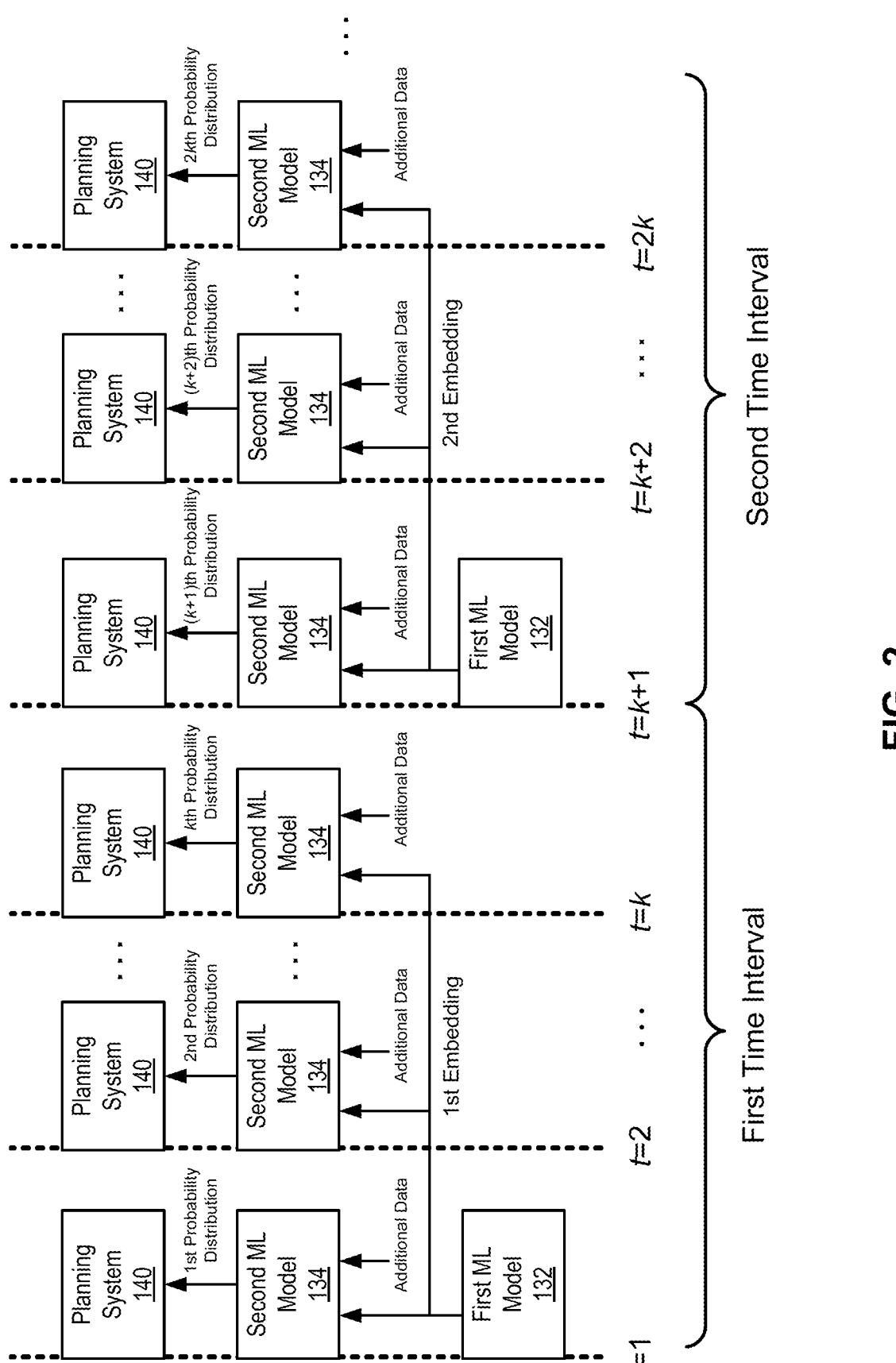
FIG. 2 depicts an example flow of data through various components of the AV of FIG. 1 for utilizing multiple machine learning models with the AV, in accordance with some implementations of the present disclosure.

FIG. 2 depicts an example time flow of the execution of the first ML model 132, the second ML model 134, and the planning system 140, in accordance with some implementations of the present disclosure. The example flow of FIG. 2 may cover a time period of a first time interval and a subsequent second time interval. Each time interval may be divided into k sub-intervals. Thus, as can be seen in FIG. 2, the first time interval includes sub-intervals $t=1$ to $t=k$, and the second time interval includes the sub-intervals $t=k+1$ to $t=2k$.

As an overview of FIG. 2, during a first sub-interval of a time interval, the first ML model 132, may generate an embedding based on data from the sensing system. The second ML model 134 may use this embedding as input during one or more sub-intervals. The second ML model 134 may use additional data (e.g., motion data for objects in the driving environment 101, traffic light data, etc.) during the one or more sub-intervals as input. The second ML model 134 may perform an inference calculation based on the input to generate a probability distribution that can be input into the planning system 140 to control the movement of the AV 100.

During a first sub-interval, designated as $1=1$, during the first time interval, the first ML model 132 may perform an inference calculation. The inference calculation may include the first ML model 132 accepting data as input. The input data may include data from the sensing system 110. The input data may include data that characterizes a trajectory of an object in the driving environment 101. The input data may characterize trajectories of multiple objects, each with their own trajectory. The inference calculation may include generating an embedding as the output of the first ML model 132.

An embedding can refer to any suitable digital representation of an input data, e.g., as a vector of any number of components, which can have integer values or floating-point values. Embeddings can be considered as vectors or points in an N-dimensional embedding space with the dimensionality N of the embedding space (defined as part of the ML model architecture) being smaller than the size of the input data. During training, the ML model can learn to associate similar sets of input data with similar embeddings represented by points closely situated in the embedding space and associate dissimilar sets of input data with points that are further apart.

The embedding generated by the first ML model 132 may include a digital representation of the driving environment 101. The embedding may include a digital representation of the roadgraph, traffic light state, positions of objects in the driving environment 101, trajectory information associated with those objects, or other information about the driving environment 101 represented in a digital form. The second ML model 134 may be trained to use at least a portion of the embedding to calculate trajectory information about one or more objects represented in the embedding, as discussed further below.

During t=1, the second ML model 134 may receive the embedding that was output by the first ML model 132. The second ML model 134 may perform an inference calculation, which may include accepting the embedding as input. The second ML model 143 may output a probability distribution. The probability distribution may include a probability distribution for the trajectory of an object in the driving environment 101. During t=1, the probability distribution output by the second ML model 134 may be provided to the planning system 140. The planning system 140 may use the probability distribution as input and may generate a trajectory of the AV 100 or may generate an update to the trajectory of the AV 100. The trajectory may include a current trajectory of the AV 100 or may be a future trajectory of the AV 100. This may include modifying the current operation of the steering 150, vehicle electronics 160, or signaling 170 in order to operate the AV 100 according to the generated trajectory.

It should be noted that although FIG. 2 depicts, at t=1, the first ML model 132, the second ML model 134, and the planning system 140 all aligned vertically, this does not necessarily denote that the actions taken by these components occur simultaneously. For example, the first ML model 132 may perform its inference calculation before the start of the sub-interval t=1 and at the start of the sub-interval t=1, the first ML model 132 may provide the result of the inference calculation (in the form of the first embedding) to the second ML model 134. The second ML model 134 may then begin its inference calculation during t=1. Similarly, the second ML model 134 may complete its inference calculation before the planning system 140 begins planning the trajectory of the AV 100 or autonomously modifying the operation of the AV 100. The vertical alignment of components in FIG. 2 denotes that some of the actions of those components happen during the same sub-interval, though not necessarily simultaneously or in an overlapping manner.

At the second sub-interval, t=2, the second ML model 134 may use the same embedding from the first ML model 132 as input and perform another inference calculation. In some implementations, the second ML model 134 may accept additional data as input to perform the inference calculation. For example, the additional data may include data from the sensing system 110. The additional data may include at least a portion of the output of the second ML model 134 during the previous sub-interval, t=1. The second ML model 134 may output another probability distribution, which may include a probability distribution for the trajectory of an object in the driving environment 101. The planning system 140 may use this probability distribution to generate an update to the trajectory of the AV 100. The second ML model 134 and planning system 140 may repeat the above operations for subsequent sub-intervals t=3, t=4, . . . , t=k during the first time interval.

During the first time interval, the first ML model 132 may accept input from the sensing system 110 and perform an inference calculation in order to generate a second embedding. The first ML model 132 may do this during the first time interval in order for the second embedding to be ready for the second ML model 134 to use during the second time interval.

The second time interval may begin, and during the first sub-interval of the second time interval, designated as t=k+1, the first ML model 132 may provide the second embedding to the second ML model 134. This may be similar to the first ML model's 132 functionality during t=1. Also, during t=k+1, the second ML model 134 may receive the second embedding output by the first ML model 132 during t=k+1. The second ML model 134 may receive additional data as input. The additional data may include trajectory data from the first time interval (e.g., trajectory data from the t=k sub-interval). The additional data may include other types of additional data, discussed herein. The second ML model 134 may use the embedding and additional as input and perform an inference calculation to generate a probability distribution for the trajectory of an object in the driving environment 101. The planning system 140 may receive this probability distribution and may generate one or more planning decisions that may plan a trajectory of the AV 100.

At subsequent sub-interval t=k+2, the second ML model 134 may perform another inference calculation using the output embedding of the first ML model 132 during t=k+1 and additional data to generate another probability distribution for the trajectory of an object. The probability distribution may then be provided to the planning system 140, and the planning system 140 may generate an updated trajectory of the AV 100 based on the probability distribution. The second ML model 134 and planning system 140 may repeat the above operations for subsequent sub-intervals t=k+3, t=k+4, . . . , 1=2k. The first ML model 132, the second ML model 134, and the planning system 140 may repeat their respective functionality for subsequent time intervals.

In this manner, the AV 100 may quickly and accurately predict the trajectories of one or more objects in the driving environment 101 without using a massive ML model during each sub-interval, thus reducing the use of computing resources of the AV 100. In some embodiments, each sub-interval (e.g., 1=1, t=2, . . . , t=k, t=k+1, t=k+2, . . . , or 1=2k) may include a time length of between 100 and 300 milliseconds. Thus, the AV 100 may be able to adjust its trajectory every 100 to 300 milliseconds without the need to execute a massive ML model each time.

FIG. 3 is a flowchart illustrating one embodiment of a method 300 of utilizing multiple machine learning models with an AV 100, in accordance with some implementations of the present disclosure. For convenience, the operations of the flowchart are described with reference to a system that performs the operations. This system may include various components of various computer systems, such as one or more components of the AV 100 of FIG. 1 (e.g., the perception system 130). Moreover, while operations of the method 300 are shown in a particular order, this is not meant to be limiting. One or more operations may be reordered, omitted, or added.

Block 310 includes generating a first embedding using a first ML model 132. Generating the first embedding may be based on an initial trajectory of an object in a driving environment 101 around the AV 100. Generating the first embedding may include the first ML model 132 using the initial trajectory of the object as input, performing an inference calculation, and outputting the first embedding.

In one or more implementations, block 310 may occur at least partially during a first sub-interval of a first time interval. In some embodiments, the initial trajectory may include a trajectory of the object during or before the first time interval or may include the first trajectory for that object determined during the execution of the method 300 or a previous execution of the method 300. This may be due to the longer time the first ML model 132 may spend performing its inference calculation.

In some implementations, generating the first embedding using the first ML model 132 may be further based on additional data provided to the first ML model 132. The additional data may include positional data of the object, velocity data of the object, or other data that may indicate the trajectory of the object. The data processing system 120 or the perception system 130 may determine the additional data based on the positional data, velocity data, or other data from the sensing system 110.

The first embedding may include a vector. The vector may include a vector of floats. The first embedding may include a numerical representation of the trajectory of one or more objects in the driving environment 101 (and, in some embodiments, other data) converted to a vector in order for the second ML model 134 to perform inference calculations. In one embodiment, the first ML model 132 may generate multiple first embeddings. The multiple first embeddings may include an embedding for each object of multiple objects in the driving environment 101.

In some implementations, the first ML model 132 may generate the first embedding at the beginning of the first time interval. Generating the first embedding at the beginning of the first time interval may include the first ML model 132 performing at least a portion of the interference calculation before the first time interval but actually outputting the first embedding at the beginning of the first time interval. This may allow the first embedding to be readily available to the second ML model 134 during the first time interval. In other implementations, the first ML model 132 may generate the first embedding at some other time during the first time interval. The second ML model 134 may operate without the first embedding for some time during the first time interval to allow the first ML model 132 time to generate the first embedding.

The additional data may further include data characterizing a geometry of the environment 101 around the AV 100. The data characterizing the geometry of the driving environment 101 (the "geometry data") may include positions of different features of the environment 101, including a road, different lanes in the road, crosswalks, traffic lights, construction zones, school zones, or objects in the environment 101. The geometry data may include bounding boxes around the features of the environment 101. The additional data may further include data characterizing a traffic signal state in the driving environment 101. The data characterizing the traffic signal state may include whether a traffic light signal is illuminated, a color of the illumination, a determination of which road lane(s) the traffic signal applies to, a meaning of the traffic signal (e.g., whether to proceed, slow down, stop, wait, etc.), or other traffic signal state data. A traffic signal can include a traffic light, a traffic sign, a traffic control device, or the like. The additional data may further characterize a trajectory of the AV 100.

The data processing system 120 may obtain one or more camera images of the driving environment 101 (e.g., from the camera(s) 118 of the sensing system 110). The data processing system 120 may determine, based on the one or more camera images, data characterizing the trajectory of an object in the driving environment 101. For example, in one embodiment, during or before block 310, the data processing system 120 may generate positional history data of an object in the driving environment 101. As discussed above, the perception system 130 may track one or more of the objects in the driving environment 101. The positional history data of an object may include data indicating the position of the object and a time at which the object was located at that position. The position of the object may include the position of the object in a plane around the AV 100. The position of the object may include the coordinates of the object. The positional history data may include multiple positions at which the object has been located. The data processing system 120 may use the positional subsystem 122 to assist in generating the positional history data. The perception system 130 may determine, based on the positional history data, the additional data, which the perception system 130 may then provide to the first ML model 132 or the second ML model 134. The perception system 130 may determine the additional data by using the positions of the object in the positional history to calculate a path the object has traveled, velocities of the object, or other trajectory information of the object.

Block 320 includes repetitively generating, using the second ML model 134, a corresponding probability distribution for a current trajectory of the object. Generating the corresponding probability distribution may be based on the first embedding and, in some implementations, additional data. The current trajectory of the object may vary for each repeated generation of the corresponding probability distribution. Generating the corresponding probability distribution may include the second ML model 134 using the first embedding, and in some implementations, the additional data, as input; performing an inference calculation; and outputting the corresponding probability distribution. Each repetition of the execution of the second ML model 134 may generate a probability distribution, thus, each probability distribution may correspond to the repetition that generated it.

In some embodiments, the second ML model 134 repetitively generating the corresponding probability distribution may include each repetitive generation of the corresponding probability distribution occurring at a respective sub-interval of one or more sub-intervals of the first time interval. The current trajectory of the object may include the trajectory of the object before or during the respective sub-interval. Thus, because the current trajectory of the object may change from sub-interval to sub-interval, the current trajectory of the object may vary for each repeated generation of the corresponding probability distribution.

A sub-interval may include a subdivision of the time interval in which the sub-interval is contained. Each sub-interval may run for a length of time that is less than the time interval in which the sub-interval is contained. For example, as discussed above regarding FIG. 2, a time interval may be divided into k sub-intervals, and each sub-interval may run for a length of 1/kth of the time interval. In some embodiments, each sub-interval belonging to the same time interval may be approximately the same length. In other embodiments, some sub-intervals of the same time interval may have different lengths. A sub-interval may include a length of time less than 300 milliseconds, and in some embodiments, each sub-interval may include a length of time less than 300 milliseconds. A sub-interval may include a time length of 100 milliseconds or more.

In one or more sub-intervals of a time interval, the second ML model 134 may use the first embedding of block 310 as input. This may include the second ML model 134 using the first embedding as input during each sub-interval. The second ML model 134 may reuse the first embedding at the one or more sub-intervals so the first ML model 132 does not need to regenerate the first embedding each sub-interval, which helps reduce the AV's 100 use of computational resources. The data processing system 120 or the perception system 130 may store the first embedding in response to it being generated by the first ML model 132. The data processing system 120 or the perception system 130 may retrieve the first embedding and provide it to the second ML model 134 during a sub-interval.

In some embodiments, during one or more of the sub-intervals of a time interval, the second ML model 134 may accept data in addition to the first embedding as input. The additional data may include data indicating an updated trajectory of an object in the driving environment 101. The first embedding of block 310 may include data indicating information that may not significantly change between sub-intervals (e.g., data regarding objects not in motion, certain geometry data or traffic signal state data) in addition to, or alternative to, trajectory data for an object, but as the time interval proceeds, the first embedding may not be updated. In order to obtain more up-to-date trajectory data of the object, the second ML model 134 may obtain additional, updated trajectory data of the object. The updated trajectory data of the object may be generated by the data processing system 120, the perception system 130, another ML model of the perception system 130, or by some other component of the AV 100. The updated trajectory data may include another embedding or data in another format that the second ML model 134 may accept as input. The data processing system 120 or perception system 130 may combine the first embedding and the updated trajectory data into a single piece of input for the second ML model 134. Combining the first embedding and the updated trajectory data may include concatenating these pieces of data, using vector addition or other vector mathematical operations, or some other combination method.

As an example, the first multiple sub-intervals of the first time interval may include a first sub-interval (e.g., t=1) and a second sub-interval (e.g., t=2). During the first sub-interval, the second ML model 134 may receive the first embedding and use it as input for an inference calculation to generate the corresponding probability distribution for the trajectory of an object. Before or during the second sub-interval, the data processing system 120 or the perception system 130 may obtain an updated trajectory of the object (e.g., by obtaining more recent sensor data from the sensing system 110). The data processing system 120 or the perception system 130 may generate data based on the updated trajectory, combine the data with the first embedding, and provide the combined data to the second ML model 134. During the second sub-interval, the second ML model 134 uses the combined data as input and may perform an inference calculation to generate an updated corresponding probability distribution for the trajectory of the object based on the updated trajectory of the object.

The corresponding probability distribution may include a probability distribution for the current trajectory of the object. The corresponding probability distribution may include multiple estimated current trajectories of the object and, for each estimated current trajectory, a corresponding probability. The corresponding probability may include the probability that the object will follow the corresponding trajectory. As an example, the corresponding probability distribution for the object may include (continue in same direction and same speed=0.7; turn 20 degrees to the left and slow down to 30 miles per hour (mph) (approx. 48.3 kilometers per hour (kph))=0.17; continue in same direction and slow down to 0 mph=0.13).

In some implementations, the second ML model 134 may generate a trajectory of the AV 100 based on the first embedding (and, in one or more implementations, the additional data). This may include, as part of the inference calculation that outputs the corresponding probability distribution for the trajectory of an object, outputting the trajectory of the AV 100. The trajectory of the AV 100 output by the second ML model 134 may include a probability distribution for the trajectory of the AV 100. The trajectory of the AV 100 may include a future trajectory of the AV 100.

Block 330 includes providing each corresponding probability distribution of the object to a planning system 140 of the AV 100. The planning system 140 may repetitively generate an update to the trajectory of the AV 100. As discussed above, each repetition of the second ML model 134 generating a corresponding probability distribution for the current trajectory of the object may occur during a sub-interval. Similarly, the perception system 130 may provide the corresponding probability distribution to the planning system 140 during that sub-interval, and the planning system 140 may, during the sub-interval, generate an update to the trajectory of the AV 100 based on the probability distribution. It should be noted that, in some embodiments, providing a corresponding probability distribution to the planning system 140 may not occur at each sub-interval.

The planning system 140 may autonomously modify operations of the AV 100 based on the update to the trajectory of the AV 100. The planning system 140 may generate a control output that may be received by the powertrain, brakes, and steering 150, the vehicle electronics 160, or the signaling 170 of the AV 100 so that these systems may operate the AV 100 according to the update to the trajectory. Modifying the operations of the AV 100 may include adjusting the steering 150 of the AV 100. Modifying the operations of the AV 100 may include accelerating the AV 100, engaging the brakes of the AV 100, or the like. Modifying the operations of the AV 100 may include modifying the signaling 170 to use a turning light, a horn or alarms, illuminate a light on a dashboard notification system or passenger notification system, or the like.

In some implementations, in block 320, a repetitive generation of the corresponding probability distribution may be further based on the corresponding probability distribution of a previous sub-interval. As an example, a first time interval may include a first sub-interval and a second sub-interval that occurs after the first sub-interval. At the first sub-interval, the second ML model 134 may generate, based on the first embedding, a first corresponding probability distribution for the trajectory of an object. At the second sub-interval, the second ML model 134 may generate, based on the first embedding and the first corresponding probability distribution, a second corresponding probability distribution. The block 320 may similarly repeat these operations for a third sub-interval occurring after the second sub-interval, a fourth sub-interval occurring after the third sub-interval, and so on, up to and including a kth sub-interval.

The method 300 may repeat for time intervals that occur after the first time interval. For example, during a second time interval that occurs after the first time interval, the system may generate, using the first ML model 132, a second embedding. Generating the second embedding may be based on the current trajectory of the object. Generating the second embedding may be further based on additional data (e.g., roadgraph data, traffic light state data, etc.). The first ML model 132 generating the second embedding may include performing an inference calculation to output the second embedding. Similar to the discussion above, in some embodiments, the first ML model 132 generating the second embedding may include the first ML model 132 performing at least a portion of the inference calculation before the start of the second time interval (e.g., during the first time interval). Generating the second embedding may include the first ML model 132 outputting the second embedding at the beginning of the second time interval (e.g., at the beginning of the first sub-interval of the second time interval).

During the second time interval, the second ML model 134 may repetitively generate corresponding probability distributions for the current trajectory of the object, similar to what was discussed above regarding block 320. The second ML model 134 may use the second embedding as input. The second ML model 134 may use additional data as input (e.g., an updated trajectory of an object in the driving environment 101). The second ML model 134 may reuse the second embedding at the one or more sub-intervals so the first ML model 132 does not need to regenerate the second embedding each sub-interval, which helps reduce the AV's 100 use of computational resources. The data processing system 120 or the perception system 130 may store the second embedding once generated using the first ML model 132 and may retrieve the second embedding and provide it to the second ML model 134 during a sub-interval. The perception system 130 may, similarly, provide the corresponding probability distributions to the planning system 140 to repetitively generate further updates to the trajectory of the AV 100.

In some implementations, the method 300 may include training the first ML model 132. The method 300 may include training the second ML model 134. The ML models 132, 134 may be trained on one or more training datasets. Each training dataset may include multiple records. Each record may include example input data and a corresponding ground truth. As discussed above, configurations of a ML model 132, 134 (e.g., a weight associated with a neuron or synapse of the ANN that forms the ML model 132, 134) may be adjusted in response to the output of the ML model 132, 134 as compared to the ground truth.

In one implementation, a training dataset record that the first ML model 132 is trained on may include data from the sensing system 110 of the AV 100. The record may include data from the positional subsystem 122 or map information 124. The record may include roadgraph data, traffic light state data, data about objects in the driving environment 101 (e.g., an object's position, velocity, acceleration, etc.). The ground truth of the record may include trajectory data indicating a future trajectory of the AV 100 or a future trajectory of an object in the driving environment 101.

In some implementations, a training dataset record that the second ML model 134 is trained on may include an embedding in the format of an embedding generated by the first ML model 132. The training dataset record may include trajectory data separate from the embedding. The ground truth may include trajectory data. The trajectory data may indicate a trajectory of the AV 100 that occurred or a trajectory of an object in the driving environment 101 that occurred.

Figure 4A:
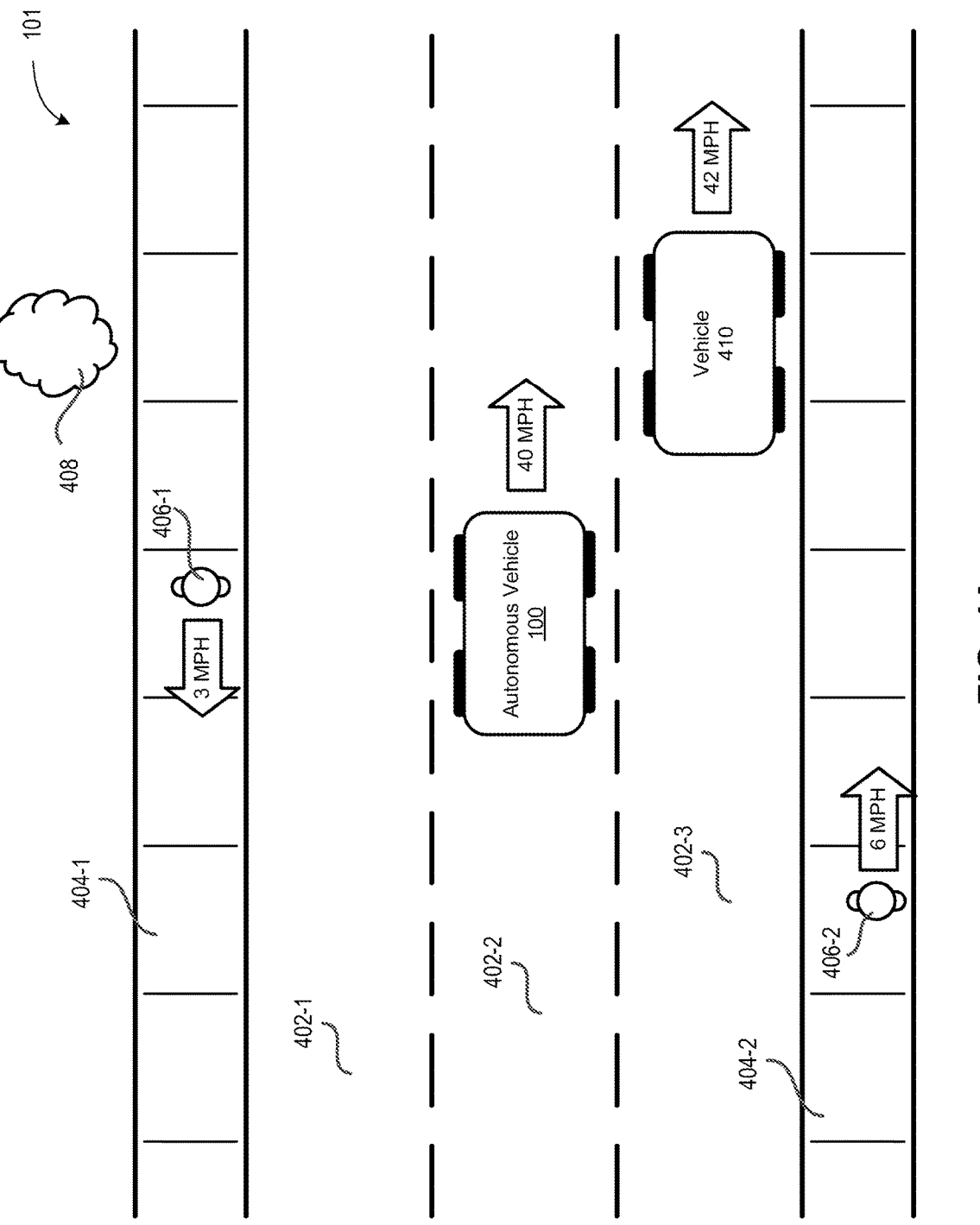
FIG. 4A depicts a top-down view of an example driving environment with an AV utilizing multiple machine learning models with the AV, in accordance with some implementations of the present disclosure.

FIGS. 4A-4D depict a top-down view of an example driving environment 101. As can be seen in FIG. 4A, the driving environment 101 may include the AV 100, in accordance with some implementations of the present disclosure. The driving environment 101 may include geometry of the driving environment 101, including the lanes of a road 402-1, 402-2, 402-3; and a sidewalk 404-1, 404-2 on each side of the road. The driving environment 101 may include objects, including pedestrians 406-1 and 406-2, a tree 408, and a vehicle 410.

FIG. 4A may depict the driving environment 101 at a first sub-interval of a first time interval (e.g., t=1). During this sub-interval, the sensing system 110 (not shown in FIGS. 4A-4D for simplicity) of the AV 100 may use its sensors 112-119 to sense positional information about the objects 406-410. The sensing system 110 may send the positional data to the data processing system 120 of the AV 100, and the data processing system 120 may use the positional data and other data (e.g., from the positional subsystem 122 or the map information 124) to generate data that characterizes the trajectory of some of the objects 406-410. This may include using the positional data with a positional history of some of the objects 406-410 to determine their current positions, one or more past positions, and one or more velocities. For example, as can be seen in FIG. 4A, the data may indicate that the first pedestrian 406-1 is traveling at 3 mph (approx. 4.8 kph) in the direction opposite the direction of travel of the AV 100, the second pedestrian 406-2 is traveling at 6 mph (approx. 9.6 kph) in a direction parallel to the AV 100's direction of travel, and the vehicle 410 is traveling at 42 mph (approx. 67.6 kph) in a direction parallel to the direction of travel of the AV 100. The data may also include information that indicates a position relative to, or a distance from, the AV 100.

At block 310 of the method 300, the perception system 130 may receive the data, which may include an initial trajectory of the objects 406-410. The perception system 130 may generate, using the first ML model 132, a first embedding based on the data. At block 320, the second ML model 134 may receive the first embedding. The second ML model 134 may use the first embedding as input and may perform an inference calculation to generate corresponding probability distributions for the trajectories of the objects 406-410. For example, the probability distribution of the first pedestrian 406-1 may include (continue in same direction and same speed=0.99; stop=0.01). The probability distribution of the second pedestrian 406-2 may include (continue in same direction and same speed=0.9; continue in same direction and speed up=0.07; continue at same speed and move slightly to the left=0.03). The probability of the vehicle 410 may include (continue in the same direction and same speed=0.1; continue in the same direction and speed up to 43 mph (approx. 69.2 kph)=0.8; change lanes to the left and speed up to 43 mph=0.1). At block 330, the data processing system 120 may provide these corresponding probability distributions to the planning system 140, which may generate an update to a trajectory of the AV 100. The update to the trajectory may include to continue in the same direction and at the same speed. The planning system 140 may autonomously modify operations of the AV 100 based on the update to the trajectory of the AV 100, which may cause the steering 150, vehicle electronics 160, or the signaling 170 to conform to the update.

Figure 4B:
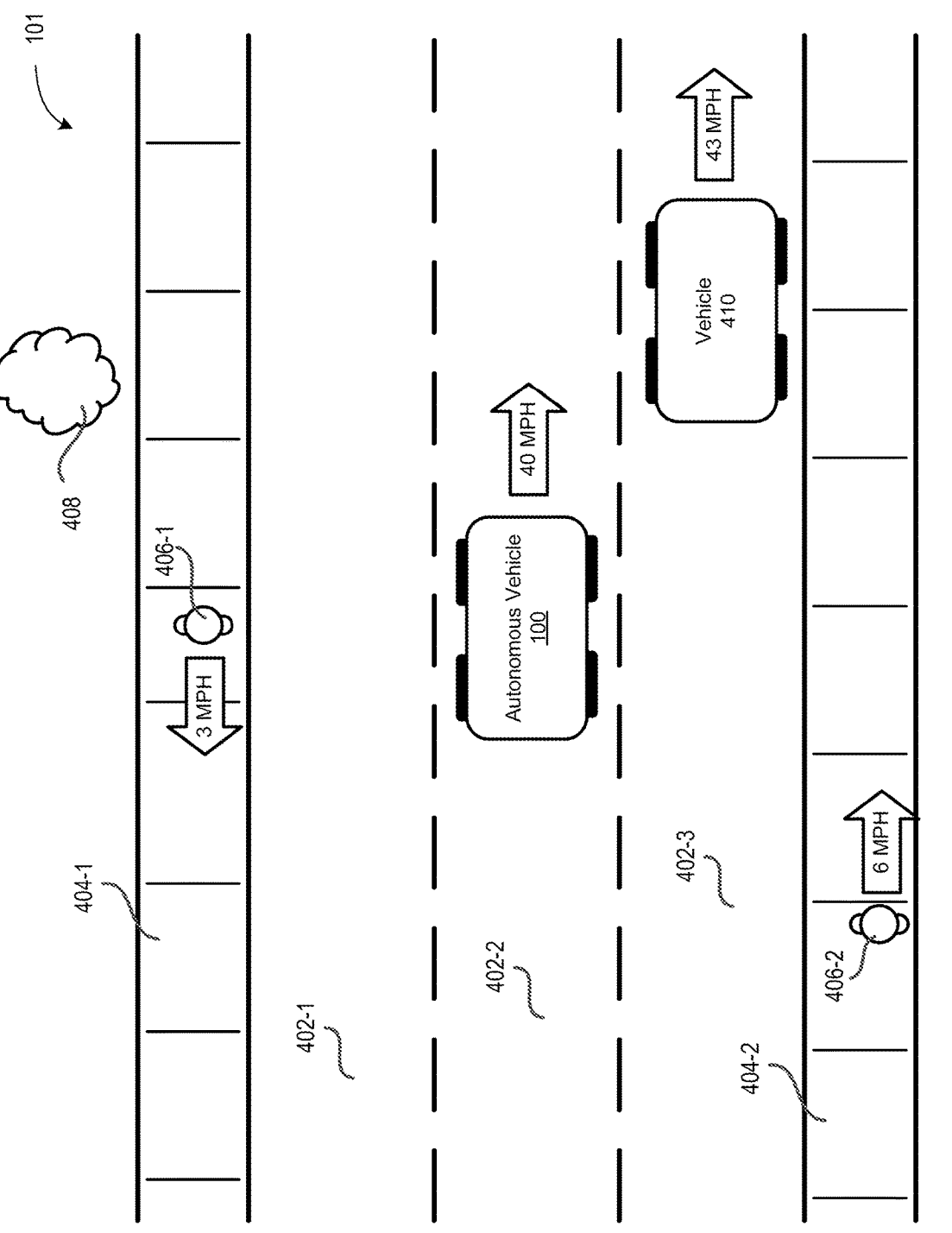
FIG. 4B depicts a top-down view of an example driving environment with an AV utilizing multiple machine learning models with the AV, in accordance with some implementations of the present disclosure.

FIG. 4B may depict the driving environment 101 at a second sub-interval (e.g., t=2) of the first time interval, which may occur after the first sub-interval of block 330. The second ML model 134 may, again, use the first embedding as input. The second ML model 134 may use additional data as input, such as an embedding generated by a component of the data processing system 120, which may have been based on data from the sensing system 110 that was sensed during the second sub-interval. The second ML model 134 may perform an inference calculation to generate corresponding probability distributions for the trajectories of the objects 406-410. The data processing system 120 may provide these corresponding probability distributions to the planning system 140, which may, again, generate an update to the trajectory of the AV 100. The update may include to continue in the same direction and at the same speed. The planning system 140 may autonomously modify operations of the AV 100 based on this update, which may cause the steering 150, vehicle electronics 160, or the signaling 170 to conform to the update. Additional sub-intervals (t=3, . . . , t=k) may occur and the second ML model 134 may continue to generate corresponding probability distributions for trajectories of objects 406-410 in the driving environment 101 and provide these probability distributions to the planning system 140 to control the operation of the AV 100 at each sub-interval.

Figure 4C:
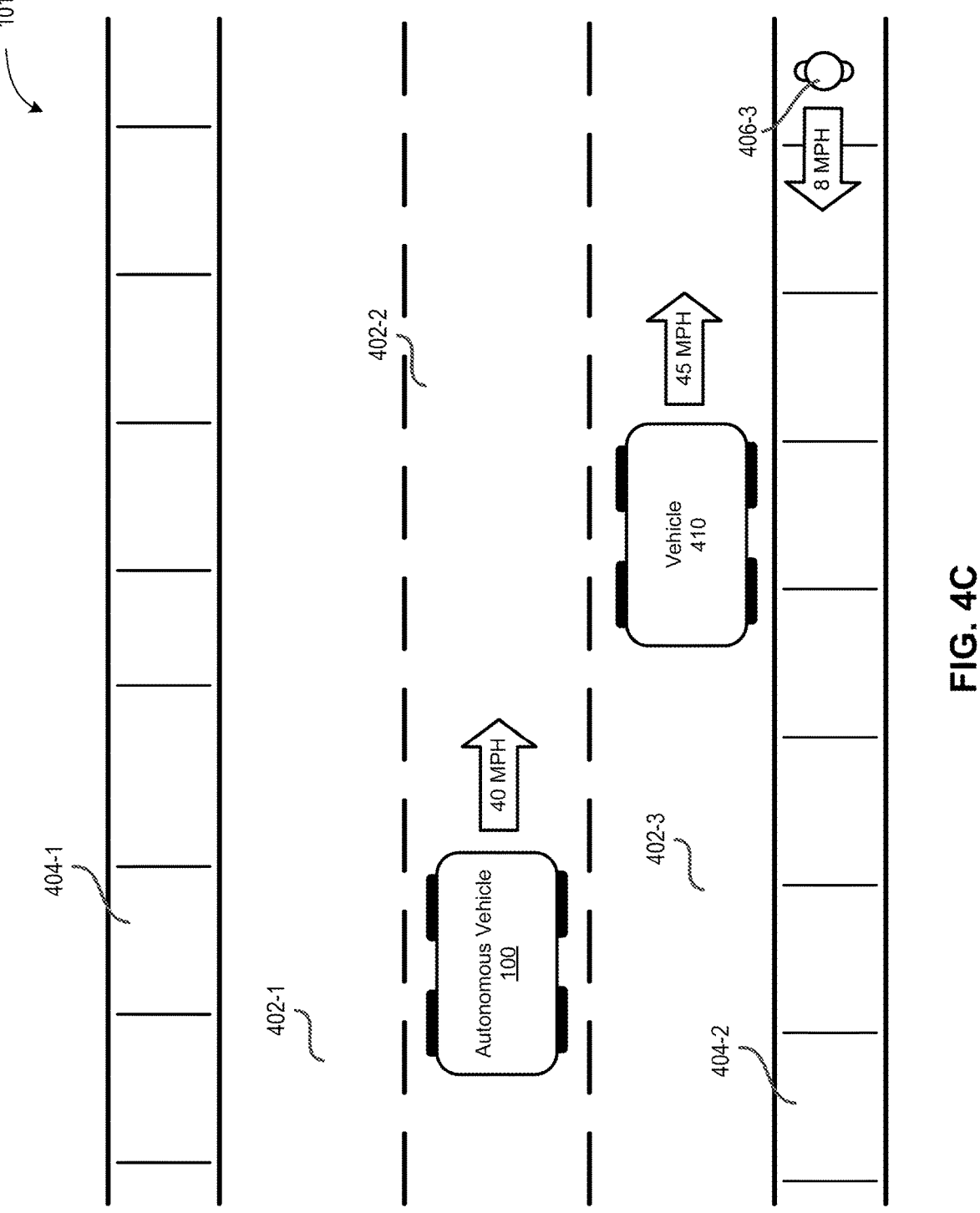
FIG. 4C depicts a top-down view of an example driving environment with an AV utilizing multiple machine learning models with the AV, in accordance with some implementations of the present disclosure.

FIG. 4C may depict the driving environment 101 at a first sub-interval of a second time interval (e.g., t=k+1). The first sub-interval of the second time interval may occur several seconds after the end of the second sub-interval of the first time interval. Thus, as can be seen in FIG. 4C, the first pedestrian 406-1, the second pedestrian 406-2, and the tree 408 may no longer be located in the driving environment 101 around the AV 100. Additionally, a third pedestrian 406-3 may be located in the driving environment 101.

During this first sub-interval of the second time interval, at block 310, the sensing system 110 of the AV 100 may use its sensors 112-119 to sense positional information about the objects 406-3, 410. The sensing system 110 may send the positional data to the data processing system 120 of the AV 100, and the data processing system 120 may use the positional data and other data (e.g., from the positional subsystem 122 or the map information 124) to generate data that characterizes the trajectory of some of the objects 406-3, 410. This may include using the positional data with a positional history of some of the objects 406-3, 410 to determine their current positions, one or more past positions, and one or more velocities. For example, as can be seen in FIG. 4C, the data may indicate that the third pedestrian 406-3 is traveling at 8 mph (approx. 12.9 kph) in the direction opposite the direction of travel of the AV 100, and the vehicle 410 is traveling at 45 mph (approx. 72.4 kph) in a direction parallel to the direction of travel of the AV 100. The data may also include information that indicates a position relative to, or a distance from, the AV 100.

The perception system 130 may receive the data and may generate, using the first ML model 132, a second embedding based on the data. At block 320, the second ML model 134 may receive the second embedding. The second ML model 134 may use the second embedding as input and may perform an inference calculation to generate a corresponding probability distribution for the trajectories of the objects 406-3, 410. For example, the probability distribution of the third pedestrian 406-1 may include (continue in same direction and same speed=0.94; turn to the left and continue at the same speed=0.03; turn to the right and continue at the same speed=0.01). The probability of the vehicle 410 may include (continue in the same direction and same speed=0.8; change lanes to the left and continue at 45 mph=0.15; change lanes to the left and slow down=0.05). At block 330, the data processing system 120 may provide these probability distributions to the planning system 140, which may generate an update to the trajectory of the AV 100. The update may include continuing in the same direction and at the same speed. The planning system 140 may autonomously modify operations of the AV 100 based on this update, which may cause the steering 150, vehicle electronics 160, or the signaling 170 to conform to the third planning decision.

Figure 4D:
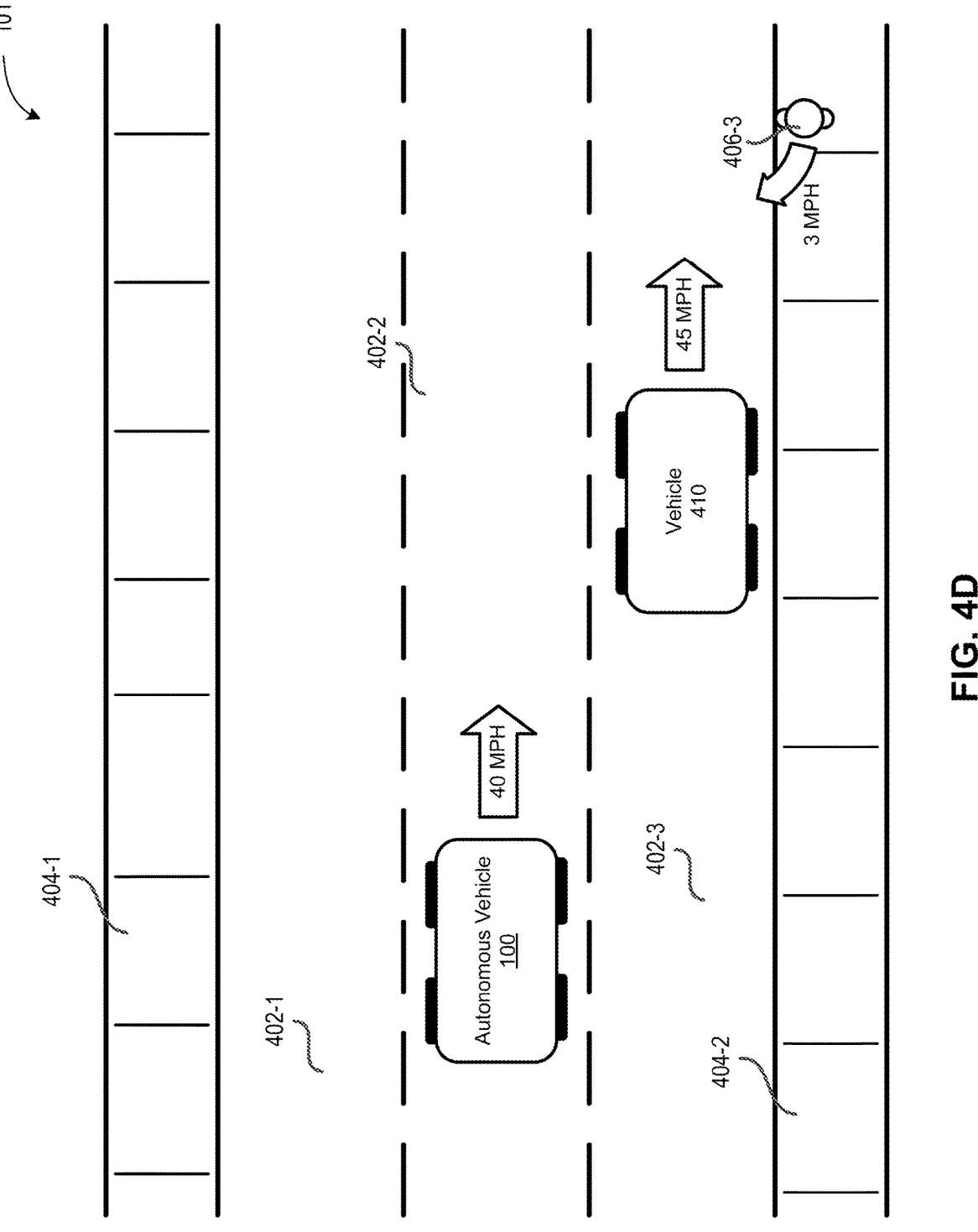
FIG. 4D depicts a top-down view of an example driving environment with an AV utilizing multiple machine learning models with the AV, in accordance with some implementations of the present disclosure.

FIG. 4D may depict the driving environment 101 at a second sub-interval (e.g., t=k+2) of the second time interval. The second ML model 134 may use the second embedding again as input. The second ML model 134 may use additional input, such as an embedding generated by a component of the data processing system 120, which may have been based on data from the sensing system 110 that was sensed during the second sub-interval. This data from the sensing system 110 may include data that senses that the third pedestrian 406-3 currently has a trajectory that includes moving at 3 mph toward the third lane 402-3, which is the lane that the vehicle 410 is currently traveling in. The data from the sensing system 110 may indicate that the vehicle 410 is still traveling in the same direction and still at 45 mph. The second ML model 134 may perform an inference calculation to generate corresponding probability distributions for the trajectories of the objects 406-3, 410. The probability distribution for the trajectory of the vehicle 410 may include (abruptly move toward the second lane 402-2 and slow down significantly=0.9; continue on the third lane 402-3 and slow down significantly=0.08; continue in the third lane and at the same speed=0.02).

The data processing system 120 may provide these probability distributions to the planning system 140, which may generate an update to the AV's 100 trajectory. The update may include the AV 100 quickly moving into the first lane 402-1 and slowing down. The planning system 140 may autonomously modify operations of the AV 100 based on this update to cause the steering 150, vehicle electronics 160, or the signaling 170 to conform to the fourth update, which may include adjusting the steering 150 to the left by a certain number of degrees, engaging the left turn signal of the signaling 170, and engaging the AV's 100 brakes.

In one implementation, the one or more computers of the data processing system 120 may include a first processing device and a second processing device. The first ML model 132 may execute on the first processing device. The second ML model 134 may execute on the second processing device. The first processing device may include a GPU. The first processing device may include a dedicated GPU that executes the first ML model 132 in order to avoid competition for processing resources with other ML models, such as the second ML model 134.

In some embodiments, the second ML model 134 may include multiple second ML models 134. The multiple second ML models 134 may be different instances of the same second ML model 134. Different sub-intervals of a time interval may include the execution of different second ML models 134. For example, the first sub-interval of a time interval may include the execution of a first second ML model 134-1, and the second sub-interval of the time interval may include the execution of another second ML model 134-2. The multiple second ML models 134 may take turns executing during different sub-intervals. The number of second ML models may be configured based on available computing resources of the data processing system 120. In some implementations, the data processing system 120 may instantiate a new instance of the second ML model 134 during the performance of the method 300. The data processing system 120 may terminate an instance of the second ML model 134 during the performance of the method 300.

A time interval may include a length of time of one second. A time interval may include a length of time of two seconds. A time interval may include a length of time of three seconds. A time interval may include a length of time of four seconds. A time interval may include a length of time of five seconds. A time interval may include a length of time of less than one second or more than five seconds.

Figure 5A:
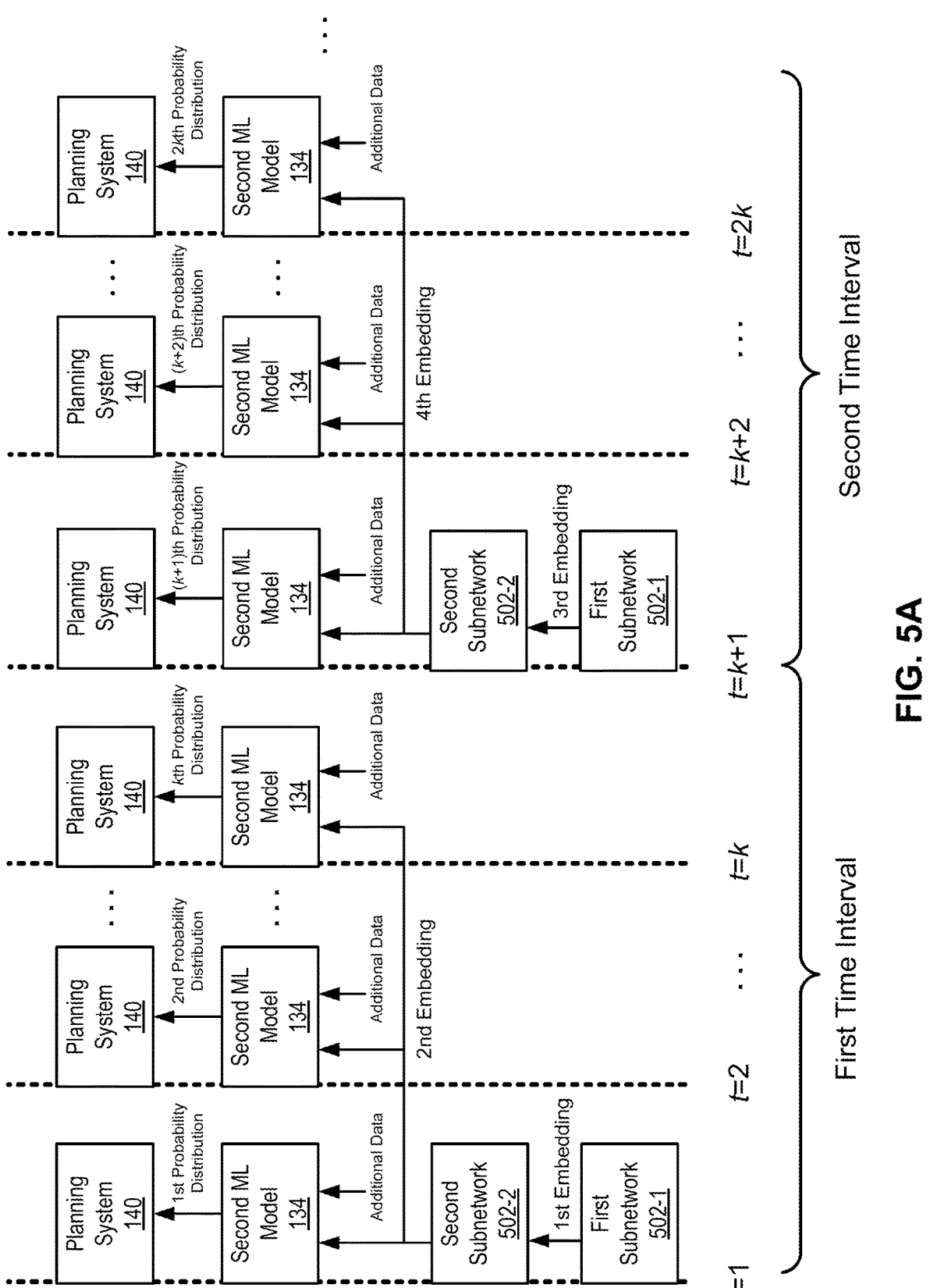
FIG. 5A depicts an example flow of data through various components of the AV of FIG. 1 for utilizing multiple machine learning models with the AV, in accordance with some implementations of the present disclosure.

FIG. 5A depicts another example time flow of the execution of the first ML model 132—which has been divided into multiple subnetworks 502-1, 502-2—the second ML model 134, and the planning system 140, in accordance with some implementations of the present disclosure. Similar to FIG. 2, the example flow of FIG. 5A may cover a time period of a first time interval and a subsequent second time interval. Each time interval may be divided into k sub-intervals. Thus, as can be seen in FIG. 5A, the first time interval includes sub-intervals t=1 to t=k, and the second time interval includes the sub-intervals t=k+1 to t=2k.

The time flow of FIG. 5A is similar to that of FIG. 2. However, in FIG. 5A, the first ML model 132 has been divided into multiple subnetworks 502: the first subnetwork 502-1 and the second subnetwork 502-2. A subnetwork 502 may include a portion of the first ML model 132 and may be smaller than the first ML model 132. The smaller size may allow the subnetwork 502 to execute without consuming as many computing resources as the full first ML model 132. The smaller size or consumption of computing resources may allow the subnetwork 502 to execute with a lower priority than the full ML model 132.

As can be seen in FIG. 5A, the multiple subnetworks 502-1, 502-2 may execute during the first sub-interval of a time interval. For example, the subnetworks 502-1, 502-2 may execute during the sub-intervals t=1 and t=k+1. The subnetworks 502-1, 502-2 may execute sequentially, i.e., the first subnetwork 502-1 may execute first, provide its output to the second subnetwork 502-2, and then the second subnetwork 502-2 may execute. The last subnetwork 502 in the sequence of subnetworks 502 (in the example of FIG. 5A, the second subnetwork 502-2) may provide its output to the second ML model 134, which may execute as discussed above in relation to FIG. 2 and FIG. 3.

The first subnetwork 502-1 may receive data from the sensing system 110, which may be similar to the first ML model 132 receiving data as discussed above in relation to FIG. 2 and FIG. 3. The first subnetwork 502-1 may use the received data to generate a first embedding. The next subnetwork 502 in the sequence (in the example of FIG. 5A, the second subnetwork 502-2) may receive the first embedding and may use it as input and generate a second embedding. The last subnetwork 502 in the sequence (in the example of FIG. 5A, the second subnetwork 502-2) may provide its output embedding to the second ML model 134, which may use it, along with additional data, as input in order to generate a corresponding probability distribution, as discussed above in relation to FIG. 2 and FIG. 3.

At the second sub-interval t=2 and subsequent sub-intervals t=3, . . . , t=k during the first time interval, the second ML model 134 may use the second embedding as input and additional data to generate a corresponding probability distribution and subsequent corresponding probability distributions, as discussed above in relation to FIG. 2 and FIG. 3. During the second time interval, the multiple subnetworks 502 may, again, sequentially execute to generate embeddings, and the last subnetwork 502 may provide its output embedding to the second ML model 134.

FIG. 5B is a flowchart illustrating one embodiment of a method 500 of utilizing multiple machine learning models with an AV 100, with at least one of the massive models being divided into multiple subnetworks 502, in accordance with some implementations of the present disclosure. For convenience, the operations of the flowchart are described with reference to a system that performs the operations. This system may include various components of various computer systems, such as one or more components of the AV 100 of FIG. 1 (e.g., the perception system 130). Moreover, while operations of the method 500 are shown in a particular order, this is not meant to be limiting. One or more operations may be reordered, omitted, or added.

In one embodiment, the data processing system 120, the perception system 130, or some other component of the AV 100 may divide the first ML model 132 into multiple subnetworks 502. The first ML model 132 may be divided into m subnetworks 502-1, . . . , 502-*m*, and the m subnetworks 502 may execute during a sub-interval of a time interval. In this manner, portions of the first ML model 132 may execute during a sub-interval without consuming the large number of computing resources that the full first ML model 132 would. For example, in FIG. 5A, the first ML model 132 has been divided into two subnetworks 502: the first subnetwork 502-1 and the second subnetwork 502-2. However, the first ML model 132 may be divided into any number of subnetworks 502.

Block 510 of the method 500, includes generating, using a first subnetwork 502-1 of a first ML model 132, a first embedding based on the trajectory of an object in the environment 101 around the AV 100. The trajectory of the object may be similar to the trajectory of the object of block 310 of FIG. 3. The trajectory of the object may include an initial trajectory of the object. The trajectory of the object may include data generated by the data processing system 120 based on data from the sensing system 110. For example, the data processing system may obtain one or more camera 118 images of the environment 101 around the AV 100 and may determine, based on those camera 118 images, the trajectory of the object.

In some embodiments, the object in the driving environment 101 may include multiple objects. Thus, block 510 may include obtaining the trajectory of each of multiple objects in the driving environment 101. The first embedding being based on the trajectory of an object may include the first embedding being based on multiple trajectories, for example, at least one trajectory for each object.

The first subnetwork 502-1 may use the trajectory of the object as input and perform an inference calculation to generate a first embedding. The first embedding may be similar to the first embedding of block 310 of FIG. 3. However, since the first embedding of block 510 is generated using a subnetwork 502 of the first ML model 132 instead of the full first ML model 132, the first embedding of block 510 may be different than the first embedding generated by the full first ML model 132 in block 310. For example, the first embedding of the first subnetwork 502-1 may be smaller (e.g., it may include a vector with fewer elements). Block 510 may occur during a first time interval and may occur during a first sub-interval of the first time interval. The functionality of this block 510 may be similar to the functionality discussed above in relation to block 310 of FIG. 3.

Block 520 may include generating, using a second subnetwork 502-2 of the first ML model 132 and based on the first embedding, a second embedding. The second embedding may be different from the first embedding. The second embedding may be a different size than the first embedding. For example, the first embedding may include a first vector that includes a first number of elements, the second embedding may include a second vector that includes a second number of elements, and the first number may be different from the second number. In some implementations, the different embeddings may have different meanings.

In some implementations, the method 500 may include generating, using a third subnetwork 502 of the first ML model and based on the second embedding, a third embedding. The third embedding may be different from the first embedding or the second embedding. The method 500 may include repeating the process of generating, using a subsequent subnetwork 502 of the first ML model 132 and based on the previous embedding, a subsequent embedding, until all of the subnetworks 502 of the first ML model 132 have executed. The last subnetwork 502 may provide its output embedding to the second ML model 134 to be used in block 530. In some implementations, the execution of each subnetwork 502 may occur during the first sub-interval of the first time interval, as shown in FIG. 5A.

Block 530 may include generating, using a second ML model 134 and based on the second embedding, a probability distribution for the trajectory of the object. Block 520 may occur during the first sub-interval of the first time interval. The functionality of block 520 may be similar to functionality discussed above in relation to block 320 of FIG. 3. The probability distribution for the trajectory of the object may include a probability distribution for the current trajectory of the object. In block 520, in some embodiments, generating the probability distribution for the trajectory of the object may include generating a probability distribution for the trajectory of each object of multiple objects in the driving environment 101.

Block 540 includes providing the probability distribution to a planning system 140 of the AV 100. The planning system 140 generates an update to the trajectory of the AV 100. The functionality of block 530 may be similar to the functionality of block 330 of FIG. 3. The method 500 may include repeating block 530 and block 540 for each sub-interval of the first time interval, similar to the repetitions discussed above regarding blocks 320 and 330 of FIG. 3. The second ML model 134 may receive different additional data at each sub-interval.

The method 500 may include repeating blocks 510-540 for subsequent time intervals. This may include, at block 510 and block 520, the sequence of the subnetworks 502-1, . . . , 502-m executing to generate their respective embeddings, and the last subnetwork 502-m providing its output embedding to the second ML model 134 so the second ML model 134 can use the embedding as input during block 530.

In some implementations, generating the first embedding using the first subnetwork 502-1 of the first ML model 132 (block 510) or generating the second embedding using the second subnetwork 502-2 of the first ML model 132 (block 520) may include causing the first subnetwork 502-1 and the second subnetwork 502-2 to be executed on a GPU or other processing device. In some implementations, the GPU or other processing device may include the different subnetworks 502-1, 502-2 at different times. For example, the data processing system 120 may load the first subnetwork 502-1 onto the GPU, the first subnetwork 502-1 may execute on the GPU, and the resulting first embedding may be stored. The data processing system 120 may then load the second subnetwork 502-2 onto the GPU (which may include overwriting the first subnetwork 502-1 or removing the first subnetwork 502-1 from the GPU), the second subnetwork 502-2 may execute on the GPU using the first embedding as input, and the resulting second embedding may be provided to the second ML model 134. Because of the relatively small size of the subnetworks 502-1, 502-2, the GPU or other processing device may assign each of the subnetworks 502-1, 502-2 similar priority regarding computing resources of the GPU or other processing device. The computing resources may include processing time, cache space, memory space, or other computing resources. In contrast, in an implementation where the full first ML model 132 uses the GPU or other processing device, the GPU or other processing device may assign the first ML model 132 a higher priority than other applications or execution processes because of the size of the first ML model 132.

FIG. 6 depicts a block diagram of an example computer device 600 capable of utilizing multiple machine learning models with an AV 100, in accordance with some implementations of the present disclosure. Example computer device 600 can be connected to other computer devices in a local area network (LAN), an intranet, an extranet, and/or the Internet. Computer device 600 can operate as a computer on the AV 100. In some implementations, the computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which can communicate with each other via a bus 630.

Processing device 602 (which can include processing logic 603) represents one or more general-purpose processing devices such as a microprocessor, CPU, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as a GPU, an application specific integrated circuit (ASIC), a field programmable gate array (FPGA), a digital signal processor (DSP), network processor, or the like. In accordance with one or more aspects of the present disclosure, processing device 602 can be configured to execute instructions for performing the methods 300 or 500 of utilizing multiple machine learning models with an AV 100.

Example computer device 600 can further comprise a network interface device 608, which can be communicatively coupled to a network 620. A network interface device 608 may include a network card, a network interface controller, or some other network interface. The network 620 may include a LAN, an intranet, an extranet, the Internet, a modem, a router, a switch, or some other network or network device. Example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 can include a computer-readable storage medium 628 (or, more specifically, a non-transitory computer-readable storage medium) on which is stored one or more sets of executable instructions 622. In accordance with one or more aspects of the present disclosure, executable instructions 622 can comprise executable instructions performing the methods 300 or 500.

Executable instructions 622 can also reside, completely or at least partially, within main memory 604 and/or within processing device 602 during execution thereof by example computer device 600, main memory 604 and processing device 602 also constituting computer-readable storage media. Executable instructions 622 can further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting,"

"causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:

generating, using a first machine learning (ML) model, a first embedding, wherein generating the first embedding is based on an initial trajectory of an object in a driving environment around an autonomous vehicle (AV);

at successive times during operation of the AV, generating, using a second ML model and the first embedding generated before the successive times, a corresponding probability distribution over a current trajectory of the object at a respective successive time, wherein the current trajectory of the object varies for each generation of the corresponding probability distribution; and providing each corresponding probability distribution to a planning system of the AV to cause the planning system to repetitively generate an update to a trajectory of the AV.

2. The method of claim 1, further comprising autonomously modifying operations of the AV based on each update to the trajectory of the AV.

3. The method of claim 1, wherein each corresponding probability distribution comprises:

a plurality of estimated current trajectories of the object; and for each of the plurality of estimated current trajectories, a corresponding probability.

4. The method of claim 1, wherein:

the first ML model comprises a first number of artificial neurons and the second ML model comprises a second number of artificial neurons; and the first number is at least ten times larger than the second number.

5. The method of claim 1, wherein the first embedding is further based on at least one of:

a geometry of the driving environment around the AV; or a traffic signal state in the driving environment around the AV.

6. The method of claim 1, wherein:

the first embedding is further based on an initial trajectory of the AV; and the method further comprises generating, using the second ML model and based on the first embedding, a future trajectory of the AV.

7. The method of claim 1, wherein:

generating the first embedding occurs at a beginning of a first time interval that comprises a plurality of sub-intervals; and each generation of the corresponding probability distribution occurs at a respective one of the plurality of sub-intervals.

8. The method of claim 7, wherein:

the plurality of sub-intervals comprises a first sub-interval and a second sub-interval that occurs after the first sub-interval; and the generation of the corresponding probability distribution at the second sub-interval includes using the corresponding probability distribution generated at the first sub-interval as input to the second ML model.

9. The method of claim 8, further comprising, at the second time interval that occurs after the first time interval:

generating, using the first ML model, a second embedding, wherein generating the second embedding is based on the current trajectory of the object;

repetitively generating, using the second ML model and the second embedding, the corresponding probability distribution for the current trajectory of the object; and providing each corresponding probability distribution to the planning system of the AV to repetitively generate further updates to the trajectory of the AV.

10. The method of claim 7, wherein each sub-interval of the plurality of sub-intervals is less than 300 milliseconds.

11. A system, comprising:

a memory; and one or more processing devices, coupled to the memory, to perform operations comprising:

generating, using a first machine learning (ML) model, a first embedding, wherein generating the first embedding is based on an initial trajectory of an object in a driving environment around an autonomous vehicle (AV);

at successive times during operation of the AV, generating, using a second ML model and the first embedding generated before the successive times, a corresponding probability distribution over a current trajectory of the object at a respective successive time, wherein the current trajectory of the object varies for each generation of the corresponding probability distribution; and providing each corresponding probability distribution to a planning system of the AV to cause the planning system to repetitively generate an update to a trajectory of the AV.

12. The system of claim 11, wherein:

the one or more processing devices comprise a first processing device and a second processing device;

the first ML model executes on the first processing device; and the second ML model executes on the second processing device.

13. The system of claim 11, wherein:

the system further comprises a sensing system of the AV, wherein the sensing system comprises one or more sensors configured to acquire a position of the object; and generating the first embedding is further based on the position.

14. The system of claim 11, wherein:

the operations further comprise obtaining a first positional history of the object; and generating the first embedding is further based on the first positional history.

15. The system of claim 14, wherein the first positional history of the object comprises a plurality of coordinates of the object and a velocity of the object.

16. The system of claim 14, wherein:

generating the first embedding and generating the corresponding probability distribution occur during a first time interval; and the operations further comprise:

obtaining a second positional history of the object, during a second time interval that occurs after the first time interval, generating, using the first ML model, a second embedding, wherein generating the second embedding is based on the current trajectory of the object and the second positional history of the object, and during the second time interval, repetitively generating, using the second ML model and the second embedding, the corresponding probability distribution for the current trajectory of the object.

17. A non-transitory computer storage media storing instructions that when executed by one or more processing devices cause the one or more processing devices to perform operations comprising:

during a first time interval, generating, using a first subnetwork of a first machine learning (ML) model, a first embedding, wherein generating the first embedding is based on a trajectory of an object in a driving environment around an autonomous vehicle (AV);

during a second time interval, generating, using a second subnetwork of the first ML model and based on the first embedding, a second embedding; and at successive times during the second time interval, generating, using a second ML model and based on the second embedding, a corresponding probability distribution over the trajectory of the object at a respective successive time; and providing the corresponding probability distribution to a planning system of the AV to cause the planning system to generate an update to a trajectory of the AV.

18. The computer storage media of claim 17, wherein generating the first embedding and generating the second embedding comprise executing the first subnetwork and the second subnetwork on a graphics processing unit (GPU).

19. The computer storage media of claim 17, wherein the operations further comprise:

obtaining one or more camera images of the driving environment around the AV; and determining, based on the one or more camera images, the trajectory of the object.

20. The computer storage media of claim 17, wherein:

the first embedding comprises a first vector that includes a first number of elements;

the second embedding comprises a second vector that includes a second number of elements; and the first number is different from the second number.

* * * * *